UNITED STATES PATENT OFFICE.

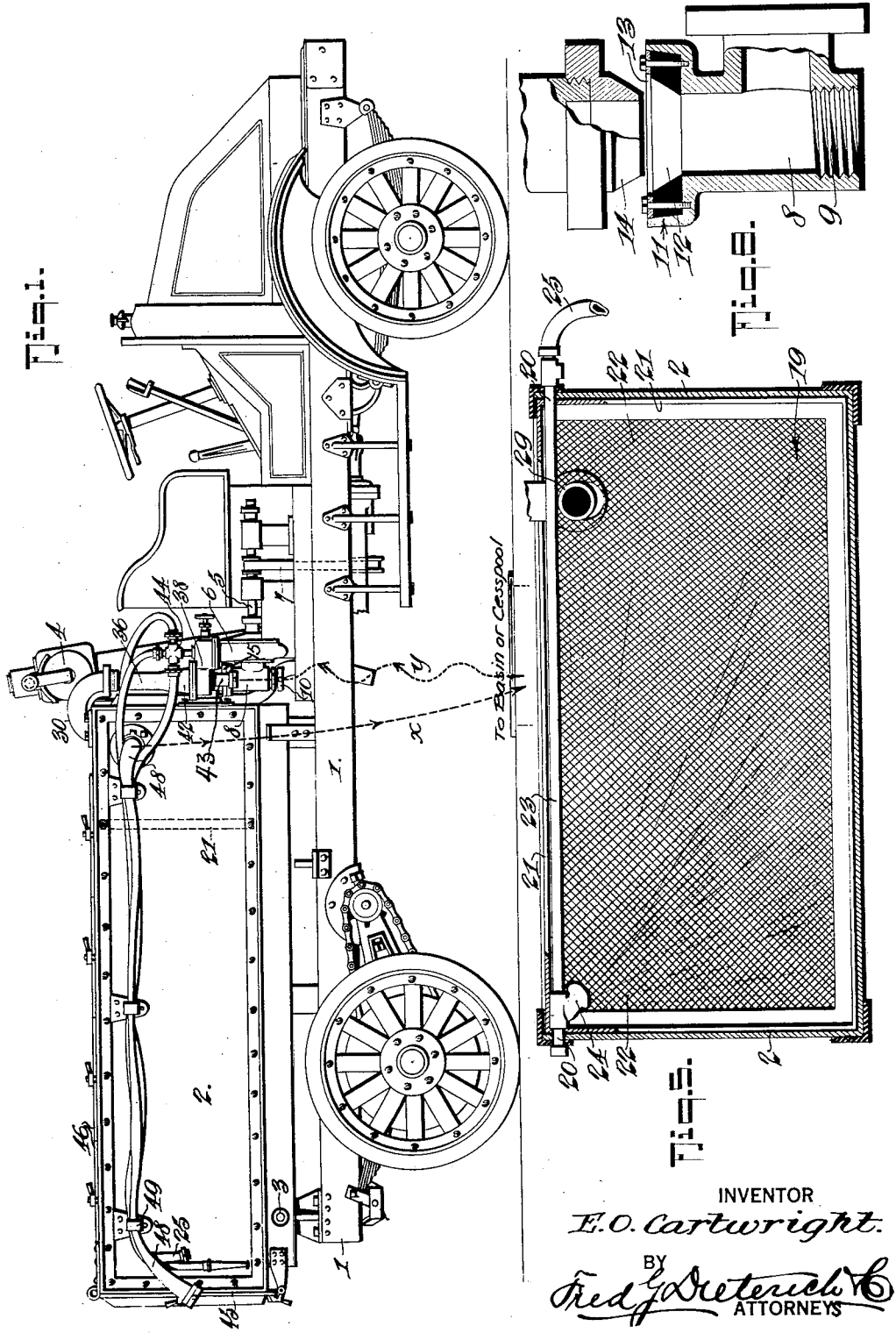

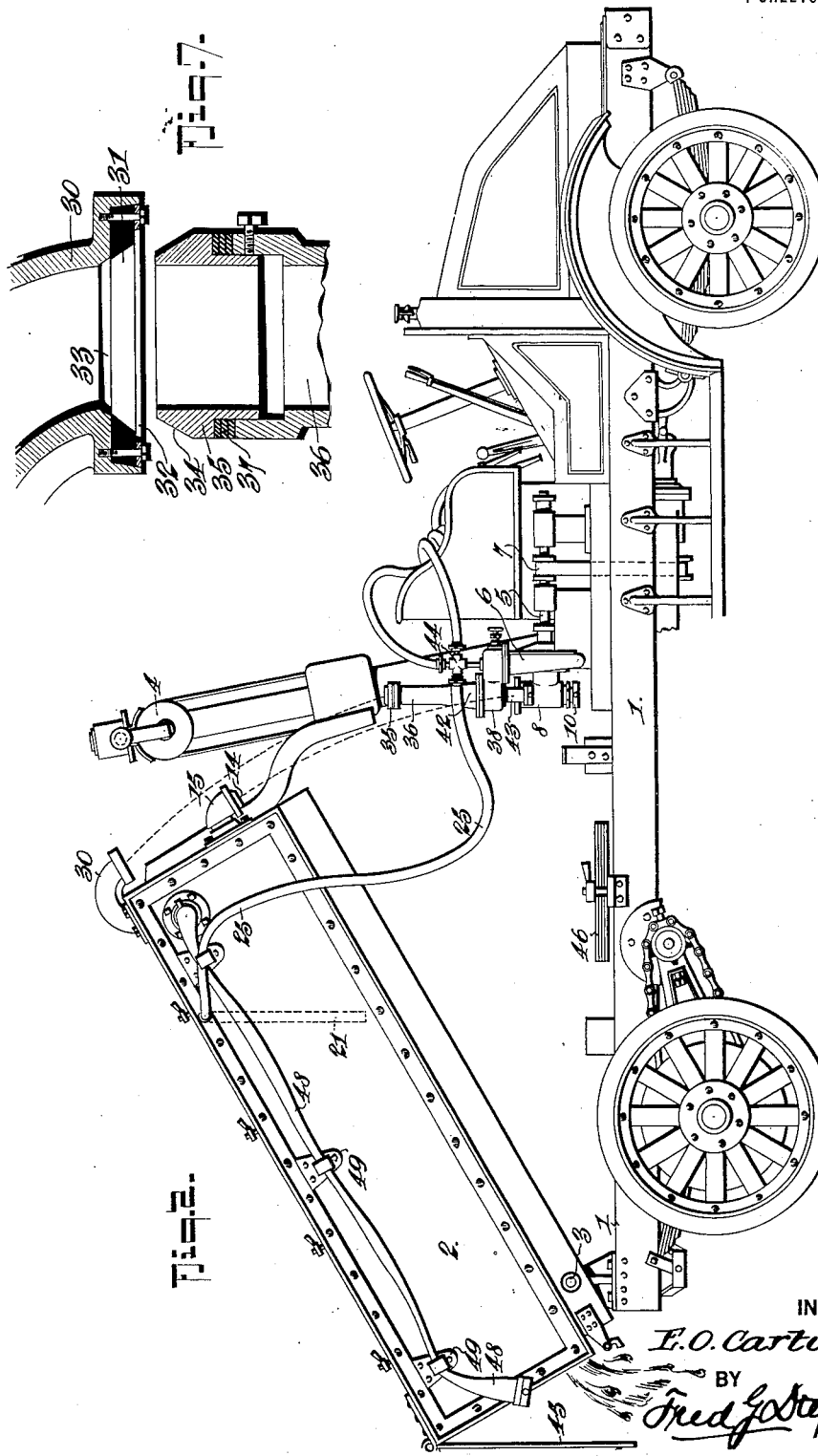

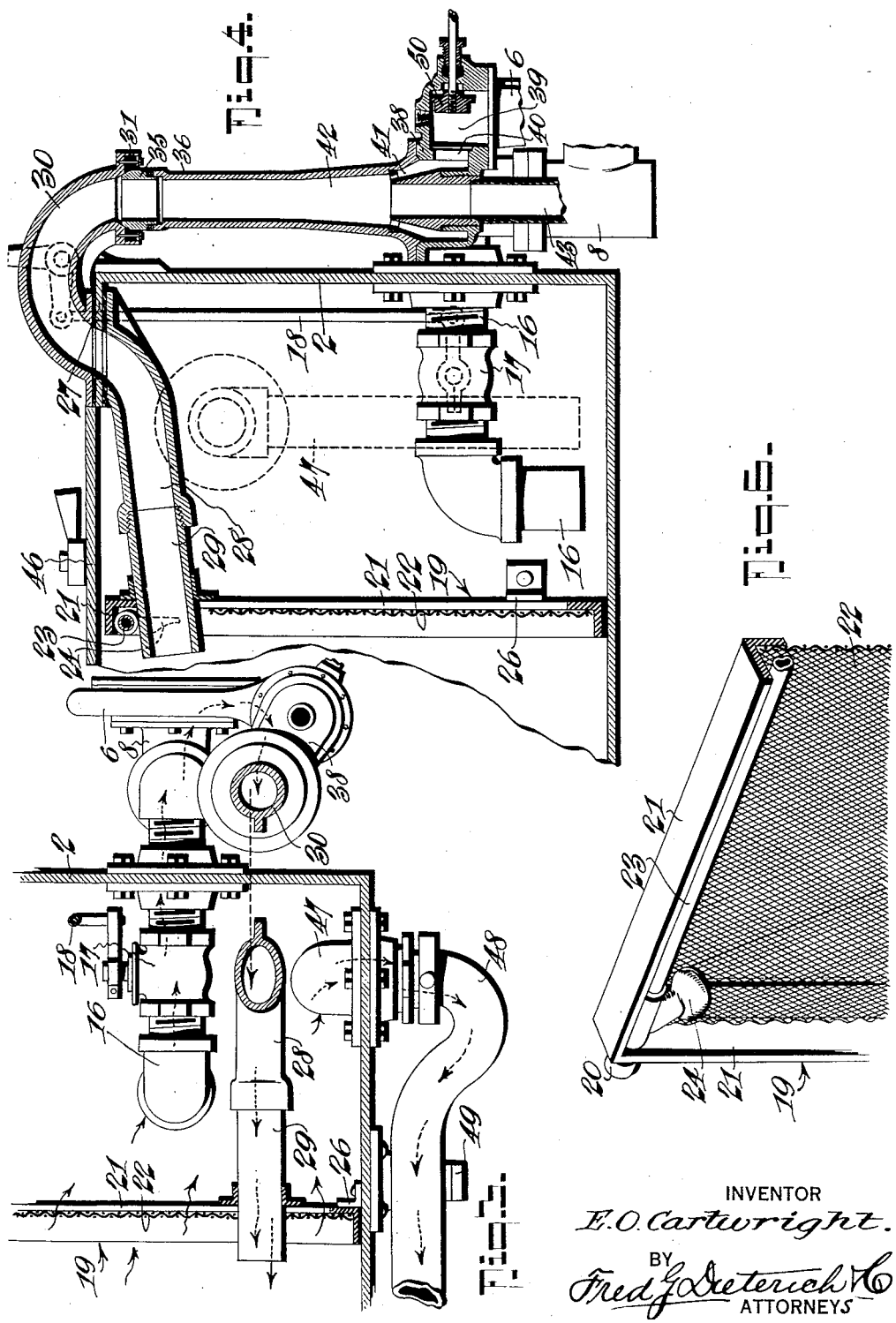

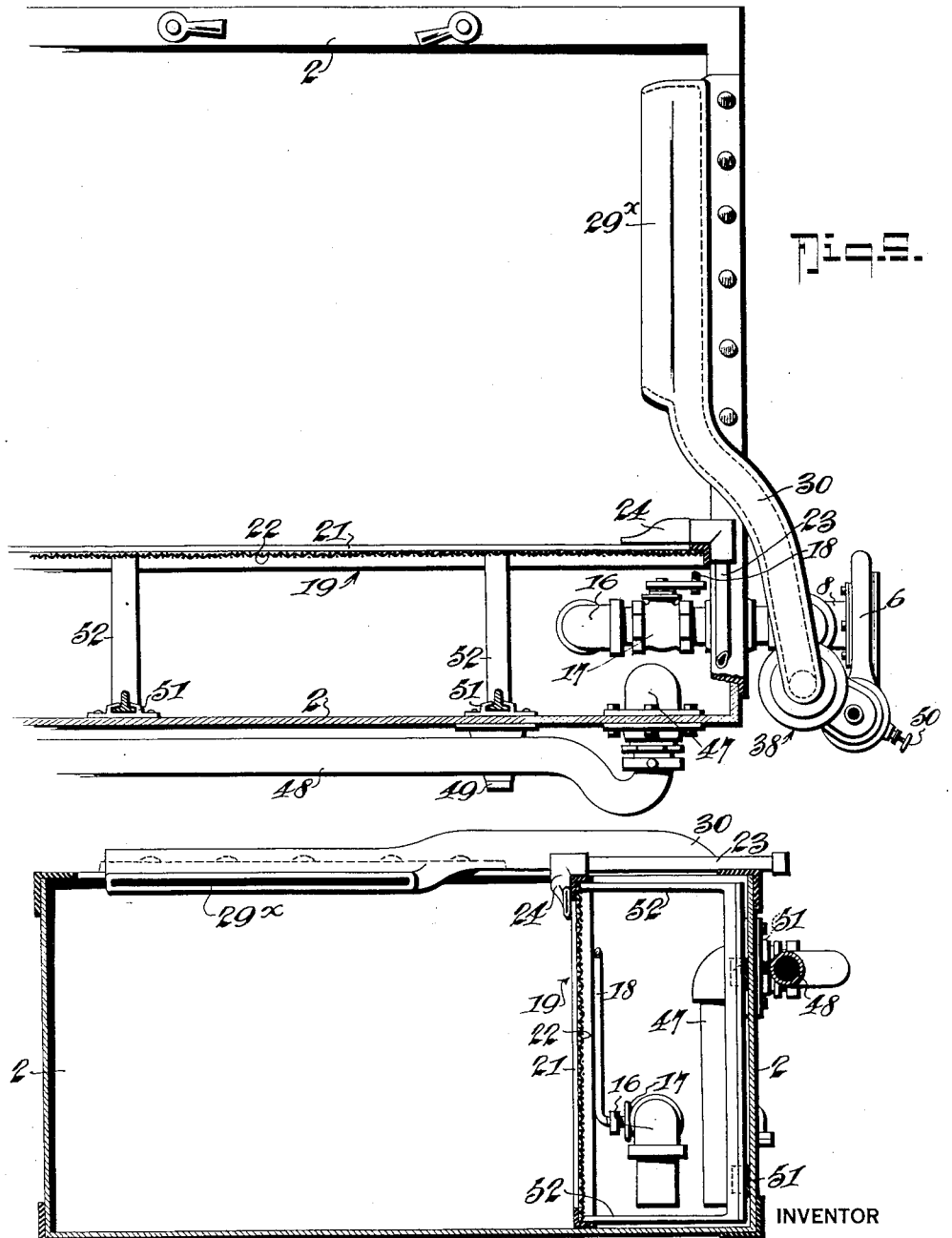

ERNEST O. CARTWRIGHT, OF SPRINGFIELD, OHIO, ASSIGNOR TO CHARLES F. GARDNER, OF SPRINGFIELD, OHIO.

PORTABLE PUMPING APPARATUS.

1,331,239.  Specification of Letters Patent.  Patented Feb. 17, 1920.

Application filed March 6, 1919. Serial No. 280,976.

*To all whom it may concern:*

Be it known that I, ERNEST O. CARTWRIGHT, a citizen of the United States, residing at Springfield, in the county of Clark and State of Ohio, have invented certain new and useful Improvements in Portable Pumping Apparatus, of which the following is a specification.

My invention, which relates to that class of pumping apparatus shown in my application for Letters Patent filed October 25, 1918, Serial No. 259,668, has for its object to provide certain new and useful improvements, especially in regard to the settling tank, and to that end the invention provides a tank divided into compartments by a perforated partition with provisions for delivering the sump (mixed solids and liquids) into one compartment from which the liquids pass through the partition into the other compartment, thereby effecting a separation of the liquids from the solids; provision is also made for the removal of the liquid from the second compartment by the pump and through an overflow duct.

Another object of the present invention is to provide means whereby the partition may be freed from clinging solids (which would tend to clog the perforations) both during the time the tank is in operation as well as during the dumping act.

A further object of the invention is to provide means whereby the partition may be hinged or pivoted so as to swing away from the bottom of the tank during dumping to thereby allow the free and rapid discharge or outflow of the fluid from the fluid compartment of the tank through the solids compartment, thereby washing the bottom of the tank, if desired.

Another object is to provide a tank by the use of which it is possible to run the pump for a longer time and consequently put more solids in the tank than has been possible heretofore; and by its use to make it practical to run the pump after the suction pipe has been taken out of use and the water thus pumped from the tank discharged to waste through one of the hose lines on the pressure chamber and the load in the tank further drained so that there is no necessity of hauling water to the dump, as would be the case if there were no drainage.

The invention in its more specific nature involves those novel details of construction, combination and arrangement of parts hereinafter described and particularly pointed out in the appended claims, reference being had to the accompanying drawings, in which:—

Figure 1 is a side elevation of a motor vehicle with my improved apparatus applied thereto, the pump, the injector, and the tank being shown in their normal operative positions.

Fig. 2 is a view similar to Fig. 1, the parts being shown in the position they assume during the dumping act.

Fig. 3 is a horizontal section of a portion of the tank illustrating, in plan view and part section, the discharge pipe to the rear compartment of the tank, the perforated partition, the pump intake from the front compartment of the tank, and the overflow connection.

Fig. 4 is a vertical section showing the parts in the operative position.

Fig. 5 is a cross section of the tank to the rear of the partition showing the nozzle for directing a jet or sheet of water over the screen surface.

Fig. 6 is a detail perspective view and part section of a portion of the screen.

Fig. 7 is a detail section showing the separable coupling or joint between the injector duct and the intake elbow of the tank.

Fig. 8 is a detail vertical section showing the coupling or separable joint between the suction inlet of the pump and the offtake or outlet elbow of the tank.

Fig. 9 is a detail top plan view, parts being broken away showing a modification of the invention.

Fig. 10 is a vertical cross section of the form shown in Fig. 9.

In the drawings, in which like numerals of reference indicate like parts in all of the figures, 1 represents the chassis frame of the motor vehicle (which vehicle may be of the usual type) on which the tank 2 is pivoted near the rear at 3, the front of the tank being arranged to be raised and lowered by an elevating mechanism 4 of the usual construction.

The driving shaft of the centrifugal pump 6 is operated from the vehicle power plant through a driving connection 7 of any desired or approved type. To the intake or suction side of the pump is coupled a three-way union member 8, whose lower end may be tapped at 9 and provided with a nipple plug 10, (Fig. 1) and whose upper end is provided with a seat 11 in which is a gasket 12 (of suitable composition, such as rubber, leather, etc.,) held in place by a clamp ring 13, the mouth of the upper way being beveled or coniform to receive the correspondingly formed end of the nipple 14 (see Fig. 8) which is carried by the elbow 15 that is secured to the tank 2 and communicates with the liquid compartment through the duct 16 in which is placed a cutoff valve 17. The duct 16 extends down to near the bottom of the tank to take the water where it is free from scum and floating matter, and it may or may not be provided with a screened intake, such as shown in my copending application. In the present form of the invention, however, the use of a screened intake is generally unnecessary.

Within the tank and dividing it into two compartments is a perforated partition 19 which is pivoted at its upper end, as at 20, to swing on a transverse axis. The partition 19 may consist of a frame 21 with screen wire 22, or any other suitable construction may be employed which will hold back solid matter and allow water to pass through. The pivotal axis of the screen may be formed by a pipe 23 which has a nozzle 24 of any well-known or suitable construction that will deliver a sheet or jet of water against the screen 22 to free it from solid and gelatinous substances. Water is fed to the pipe 23 from the pressure side of the pump through one of the hose connections 25. A suitable stop 26 may be provided to hold the partition vertical against pressure of solid matter in the rear chamber, especially when the water is pumped out of the forward chamber through the duct 16.

Secured at the top, as at 27, of the forward end of the tank, is an inlet elbow 28 to which the pipe 29 that projects through the partition 19, is joined. The pipe 29 delivers the material elevated by the pump and delivers it into the rear compartment of the tank at any suitable place.

30 is another elbow secured over the entrance of the elbow 28 and having its entrant end socketed to receive a gasket 31 which is held in place by a washer 32, the same having a beveled or coniform mouth 33 to fit over the correspondingly formed end 34 of the nipple 35 which is supported in the discharge end 36 of the injector nozzle 42, such end being recessed to receive the shank of the nipple and provide for the use of shims or washers 37, as shown.

The injector may be of any approved construction but in the form illustrated it comprises a pressure chamber 39 which delivers through a valve controlled passage 40 to the chamber 41 from which the fluid passes into the outlet duct 42 together with the material sucked up through the intake duct 43 to which the suction hose (indicated diagrammatically by dotted lines $y$, Fig. 1) is to be connected. As before stated, the injector may be of any approved construction as, for instance, that shown in my copending application hereinbefore referred to or it may be of any other suitable construction as, for example, that shown in my copending application Serial No. 281,272. As the construction of the injector, *per se*, forms no part of the present application no further description thereof is thought to be necessary.

44 is a distributing union tapped into the pressure chamber 39 of the injector and with which a number of hoses 25 are coupled so that they may be utilized, as desired.

45 represents the tail gate of the tank which is constructed to fit water-tight and is hinged at the top to swing open (see Fig. 2) in dumping the load. The tank may be closed by suitable cover plates 46 as in the construction shown in my application first above referred to.

The overflow pipe 47 preferably is carried down so that its entrance is adjacent to the bottom of the tank to avoid the scum and it delivers through a flexible hose 48 as in my aforesaid first mentioned application.

Before proceeding with the detailed description of the operation of the apparatus hereinbefore explained and as shown in the drawings, three functions of the said apparatus should be here stated, namely, First: For the evacuation of cesspools, sumps, basins or depressions or excavations in which the character of the contents is such that they should not pass through the pump without partial separation from the solids contained in them;

Second: The pumping of liquids directly by means of the pump and delivering them either to the tank for hauling, or to a distant point by piping;

Third: For purposes of spraying liquids from the tank or delivering the same, under pressure, at a distant point.

Referring now to the operation of the apparatus, the first function or method of its use is best explained as follows:

Hose 48 is removed from its holding brackets 49 and its free end connected to a source of water pressure, and through it the tank is supplied with a suitable quantity of water. The hose 48 is then disconnected from the water supply and permitted to hang from its connection (see arrow $x$ on Fig. 1) to act as an overflow channel for the tank.

The stop cock 17 now opened by means of the pull rod 18, when the water within the tank passes through the duct 16, and the coupling 15, to the pump, which latter is thus primed for operation.

Upon application of power to the pump, water is forced through the orifices of the injector forming a jet which creates a partial vacuum in the straightway channel or passage 43, causes the water to pass up through the nipple 42, the elbows 30 and 28, and the pipe connection 29, into the rear chamber of the tank.

Now, if the nipple 43 be connected to any cesspool, sump, basin or other depression which collects sediment or accumulations that require periodically to be removed, the liquid and contaminations will be drawn up (see dotted lines and arrow y on Fig. 1) through the injector passage and forced through passage 42—30—28—29 and deposited in the rear compartment of the tank where the sediment and solids precipitate in an ever widening zone as more contaminations are deposited and the clarified liquid finds its way through the partition 19 into the forward compartment from whence the liquid passes through duct 16 to the pump, whence it is returned in the circuit through the injector passage, again to the tank, continuing the jet which brings more contaminated liquid to be precipitated as before.

The overflow hose 48 conveys to any outside point of waste, the clarified liquid that collects within the tank beyond the level of the hose connection to the tank.

The operation just explained is continued until the tank is desirably loaded with precipitation, after which the pump is stopped, hose connection 48 restored upon the brackets 49, the stop cock 17 closed, the lift pipe from the cesspool is disconnected from the nipple 43, after which the apparatus is transported to a desired point for the dumping of its contents.

In order to facilitate the dumping operation and to minimize adjustment that might be required upon restoring the tank to its normal position, the detachable gasketed joints in the T coupling 8 and in the elbow 30, hereinbefore referred to, have been provided so that, when the front end of the tank is elevated for dumping, as indicated in Fig. 2, the joinings mentioned will separate and when the tank is restored (swung down) to the normal position, the two joints mentioned will automatically close.

In explaining the second function, a generally stated operation of the parts is as follows:

Stop cock 17 is closed and the hose cap 10 is removed and the place of the latter in the union 8, is taken by any suitable hose connected with any desired source of supply.

The injector valve 50 may be closed, and when closed, the liquid can be pumped through the hoses 25 on opening their nozzle valves, or by opening the valve 50, it may be deposited into the tank.

By reversing the changes enumerated for this last stated function, it is obvious that the apparatus is restored for use according to the first stated operation.

For the third stated function, or use, the stop cock 17 is open and the hose cap 10 is in its place closing union 8, the plug valve 50 being at either the open or closed position—open if it be desired to agitate the liquid in the tank, closed if only pressure at the terminal 44 is desired—and upon applying power to the pump, liquid in the tank may be disposed at any desired point.

If the screen 22 becomes clogged with solids or slime, by attaching one of the hoses 25 to the pipe 23, the screen can be effectively washed and the accumulation of clogging matter removed. The screen washing nozzle may also be employed during the operation of the apparatus to keep the solid matter from clogging the screen during the separation of the water from the solids.

By making the partition 19 to swing in the manner of the tail gate any water and scum which remains in the forward compartment of the tank will be evacuated when the tank is being dumped. It will be observed that by the present construction a screen of relatively large area is provided to properly protect and supply the pump intake when the tank becomes generously filled with leaves, twigs, papers and other mucky matters brought up by the suction and discharged into the tank. By the use of the large screen and the water curtain from the nozzle that delivers against the screen, the pump will work well even when the contents of the tank become jelly-like in consistency.

Furthermore, by providing the suction duct 16 to the pump with the turn-down elbow in the tank so as to take water from a low level, it will facilitate the draining of the tank and by providing a similar arrangement with regard to the overflow outlet, the overflow may function without allowing floating matter to escape with the water.

In this application I make no claim to the specific construction of the injector as that forms the subject matter of my aforesaid copending application filed on even date herewith.

From the foregoing description taken in connection with the accompanying drawings, it is thought the complete construction, manner of operation and advantages of my invention will be readily understood by those skilled in the art.

Changes in the details of construction and arrangement of parts may be readily made to suit the particular requirements of practice and without departing from the spirit of the invention. For instance, the partition 19 may be arranged longitudinally of the tank, as shown in Fig. 9, and detachably mounted by brackets 52 in guides 51 and the material injected into the tank may be passed through a wide mouth distributing nozzle 29$^x$. Other similar changes may be made as conditions met with in practice may require.

What I claim is:

1. In apparatus of the class described, a settling tank, a support for the tank, means for hinging said tank on said support whereby said tank can be tilted for dumping purposes, a tail gate for the tank adapted to be opened in dumping, a swinging screening partition within the tank dividing the same into a solids and a liquid chamber, means for delivering the solid and liquid material into the solids chamber, means for drawing off the liquid from the liquid chamber as it separates from the solid and passes through the partition, said partition comprising a screened frame, and means for hingedly mounting said frame at the top to swing on a transverse axis whereby as the tank is elevated to dump the partition will tend to maintain a vertical position and thereby allow the material from both compartments to be discharged through the discharge end of the tank and a screen washing nozzle arranged to deliver a jet sheet of water against the face of the screen in a plane approximately parallel thereto and on the side adjacent to the solids chamber.

2. In apparatus of the class described, a separating tank, a screen partition in the tank dividing the same into a solids and a liquid compartment, means for pumping material into the solids compartment and withdrawing the liquid from the liquid compartment, a washing nozzle arranged to direct a jet sheet of water against the face of the partition and substantially in a plane parallel thereto, and means for supplying said nozzle with fluid from the liquid compartment via the pump.

3. In apparatus of the class described, a separating tank, a screen partition in the tank dividing the same into a solids and a liquid compartment, means for pumping material into the solids compartment and withdrawing the liquid from the liquid compartment, a washing nozzle arranged to direct a jet sheet of water against the face of the partition and substantially in a plane parallel thereto, means for supplying said nozzle with fluid from the liquid compartment via the pump, said nozzle being located at a corner of the screen on the side adjacent to the solids compartment.

4. In apparatus of the character described, a tank, a support for the tank, means for elevating one end of the tank to dump, a permeable partition dividing the tank into a solids and a liquid chamber, means for depositing the material in the solids chamber whereby the liquid will pass through the partition into the liquid chamber and be separated from the solids thereby, and means located at the side of the partition adjacent to the solids chamber for clearing the partition of obstructing solid matter.

5. In apparatus of the character described, a tank, a support for the tank, means for elevating one end of the tank to dump, a permeable partition dividing the tank into a solids and a liquid chamber, means for depositing the material in the solids chamber whereby the liquid will pass through the partition into the liquid chamber and be separated from the solids thereby, means for clearing the partition of obstructing solid matter, said last named means comprising a water nozzle adapted to direct a jet or sheet of water against the face of the partition and in a direction substantially approximately parallel thereto and thereby wash off clogging material.

6. In apparatus of the class described, a truck, a tiltable tank on the truck, a pump mounted on the truck, an injector coöperative with the pump for forcing the material into the tank, means in the tank for effecting a continuous separation of the liquid from the solid material, means coöperative with the pump for drawing the liquid material from the tank, said separating means comprising a screen partition dividing the tank into two compartments, and means operated by said pump for clearing said screen partition of clogging solids.

7. In an apparatus of the class described, a settling tank, said tank having a tail gate adapted to be opened to permit the discharge of material, a transversely located perforated partition within the tank to divide the same into a front and rear compartment, means for elevating and lowering the tank to dump the material when the tail gate is opened, means for hingedly mounting said perforated partition across its upper edge to swing away from the bottom of the tank when the tank is tilted, and means for washing said partition, said means comprising a water pipe and a nozzle for directing water against the surface of the partition on the side adjacent to that chamber in which the solid material collects and means for drawing off water from said tank and delivering it to said water pipe.

8. In apparatus of the class described, a tank, a duct for delivering material into said tank, said duct including an elbow union secured to the top of the tank and extending over the front of the same, a second elbow within the tank communicating with the first mentioned elbow, a duct from said second elbow for delivering material into the tank, a perforated partition through which said last named duct projects for separating the solids from the liquids and dividing said tank into two compartments, and an outlet for said tank, the entrance to which outlet is located adjacent to the bottom of the tank substantially as shown.

9. In apparatus of the class described, a settling tank, a partition separating the tank into compartments, an intake elbow secured to said tank and extending over the top edge of the same, a duct having an elbow within the tank communicating with said first mentioned elbow for delivering the material into one of said compartments, a device including a duct communicating with the projecting end of said first mentioned elbow for delivering the material thereto, and means for conducting the contents of the other compartment to the outside of the tank.

ERNEST O. CARTWRIGHT.